No. 834,759. PATENTED OCT. 30, 1906.
J. G. SAUNDERS.
APPARATUS FOR DISTILLING TURPENTINE.
APPLICATION FILED MAY 29, 1906.
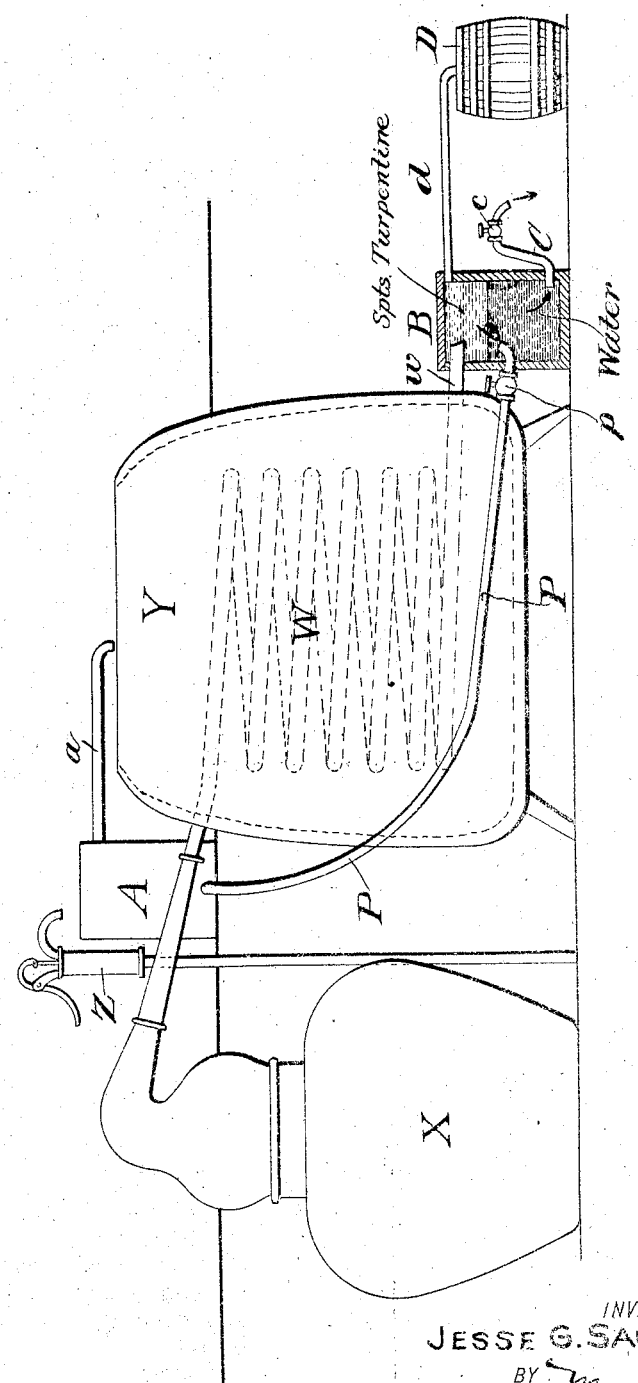
WITNESSES
INVENTOR
JESSE G. SAUNDERS
BY
ATTORNEYS

UNITED STATES PATENT OFFICE.

JESSE G. SAUNDERS, OF LAKE PARK, GEORGIA.

APPARATUS FOR DISTILLING TURPENTINE.

No. 834,759.

Specification of Letters Patent.

Patented Oct. 30, 1906.

Application filed May 29, 1906. Serial No. 319,279.

*To all whom it may concern:*

Be it known that I, JESSE G. SAUNDERS, a citizen of the United States, residing at Lake Park, in the county of Lowndes and State of Georgia, have invented a new and useful Improvement in Apparatus for Distilling Turpentine, of which the following is a specification.

In distilling spirits of turpentine from the crude gum water is introduced into the still during the whole time a charge is being run, and the evaporated spirits passes over into the worm along with a certain amount of water, and when they reach the receiving-chamber the condensed turpentine, being of less specific gravity than the condensed water, accumulates as a supernatant layer above the water and is run off into barrels. The length of time that it requires to run off a charge is such that the water in the tank that contains the worm becomes very hot, and the condensed water and spirits as they come from the worm are also very hot. This is very objectionable, because the spirits evaporate greatly at this high temperature. Furthermore, it is very undesirable to run the spirits into the barrels when hot, because when the spirits go into the barrels hot it swells the barrel and in a few days when it cools the barrel shrinks and allows the turpentine to leak out, the penetrating nature of turpentine being such that it easily finds minute outlets.

My invention is designed to obviate all of these objections; and it consists in a very simple apparatus for accomplishing the same, the leading feature of which consists in means for maintaining a constantly-flowing stream of cold water beneath the supernatant body of spirits in the closed receiving-chamber which receives the commingled turpentine and water from the still, whereby the turpentine is quickly cooled below the point of evaporation before exposure to the air and the heating of the barrels is avoided, as hereinafter more fully described with reference to the drawing. This drawing shows in side elevation a turpentine-still equipped with my invention, which is partly shown in section.

X is the still which connects with and discharges into the worm W. This worm is immersed in the usual way in a body of water in the tank Y.

A is an elevated cold-water tank into which water is discharged more or less continuously from a pump Z. From the tank A cold water flows through the pipe $a$ into the tank Y around the worm in order to fill the tank. From the elevated tank A a pipe P, with valve $p$, leads to the receiving-chamber B, which receives the condensed spirits and water from the worm through the pipe $w$.

As the condensed spirits of turpentine and the water pass from the worm into the closed receiving-chamber B they separate in layers according to their different specific gravities, as shown by the line $b$, the spirits of turpentine being lighter than the water and accumulating as a supernatant stratum above the heavier and subjacent water and the turpentine being run off at the upper level by a pipe $d$ into the barrel D as fast as it accumulates in the receiving-chamber B.

It will be obvious that if the receiving-chamber B had only the inlet-pipe $w$ from the worm and an outlet for the turpentine and water the turpentine and water in chamber B would partake of the same high temperature as the tank-water around the worm. To prevent this is the object of my invention, and for that purpose I maintain in the lower part of the receiving-chamber B a constantly-flowing body of cold water in direct contact with the supernatant body of turpentine. This water is taken from the elevated tank A through pipe P, the water passing out through the pipe C, which rises to the point at which it is desired to maintain the water-level in the receiving-chamber. The cold-water-supply pipe P has a valve $p$, and the overflow-pipe C has also a valve $c$, by which the flow through these pipes may be adjusted or entirely cut off. The outlet or overflow pipe C is extended upwardly above the point where it connects with the receiving-chamber, so as to always maintain a body of water under the turpentine.

By the means described the hot spirits of turpentine as it comes from the worm of the still is cooled down to or even below atmospheric temperature without exposure to the air and without any loss by evaporation or any swelling and subsequent leakage of the barrels.

I claim—

1. A turpentine-still having a closed receiving-chamber with an inlet near the top connected to the outlet end of the worm, said receiving-chamber having an outlet near the top for turpentine and a cold-water inlet and outlet below the same and a source of cold-water supply connected to the cold-water inlet of the said receiving-chamber.

2. The combination with a still and its worm; of a closed receiving-chamber with an inlet near the top connected to the worm and having an outlet near the top for the condensed turpentine, a cold-water inlet and outlet for said receiving-chamber located below the turpentine-outlet and an elevated tank for cold water connected to the cold-water inlet of the receiving-chamber.

3. The combination with a still and its worm; of a closed receiving-chamber with an inlet near the top connected to the worm and having an outlet near the top for the condensed turpentine, an elevated tank with pipe leading therefrom to the receiving-chamber and provided with a regulating-valve and an outlet-pipe from the receiving-chamber having means for regulating the outflow.

4. The combination with a still and its worm; of a closed receiving-chamber with an inlet near the top connected to the worm and having an outlet near the top for the condensed turpentine, and a cold-water inlet and outlet pipe for the receiving-chamber, the outlet-pipe being extended upwardly above its connection with the receiving-chamber to maintain the level of water therein.

JESSE G. SAUNDERS.

Witnesses:
W. T. HARRELL,
N. K. FRY.